United States Patent
Achyuth et al.

(10) Patent No.: US 11,432,171 B2
(45) Date of Patent: Aug. 30, 2022

(54) PROVIDING UNINTERRUPTED ACCESS TO RESOURCES VIA A MOBILE HOTSPOT CONNECTION

(71) Applicant: Citrix Systems, Inc., Fort Lauderdale, FL (US)

(72) Inventors: Nandikotkur Achyuth, Bengaluru (IN); Divyansh Deora, Bengaluru (IN); Arnav Akhoury, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 177 days.

(21) Appl. No.: 16/734,783

(22) Filed: Jan. 6, 2020

(65) Prior Publication Data

US 2021/0211902 A1 Jul. 8, 2021

(51) Int. Cl.
*H04W 24/04* (2009.01)
*H04W 72/08* (2009.01)

(52) U.S. Cl.
CPC ......... *H04W 24/04* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 10,462,683 | B1* | 10/2019 | Goff | H04L 43/0811 |
| 2012/0159235 | A1* | 6/2012 | Suganthi | G06F 11/203 |
| | | | | 714/4.11 |
| 2013/0294306 | A1 | 11/2013 | Borges et al. | |
| 2014/0075011 | A1* | 3/2014 | Salkintzis | H04L 67/00 |
| | | | | 709/224 |
| 2015/0016241 | A1* | 1/2015 | Ruffini | H04W 40/28 |
| | | | | 370/216 |
| 2017/0078962 | A1* | 3/2017 | Hassan | H04W 76/10 |

OTHER PUBLICATIONS

Hardwick, Tim: Mar. 30, 2021 "How to Use Instant Hotspot on I Phone and I Pad-MacRumors", Oct. 18, 2019 (Oct. 18, 2019), pp. 1-12,Retrieved from the Internet: URL:https://www.macrumors.com/how-to/use-personal-instant-hotspot ios/#:-:text=Note%20the%20Auto%2DJoin%20Hotspot,Ask%20to%20Join%2C%20or%20Never.Retrieved Mar. 30, 2021 XP055791359.
International Search Report and Written Opinion on PCT Appl. No. PCT/US2020/067321 dated Apr. 12, 2021.

* cited by examiner

*Primary Examiner* — Jenkey Van
(74) *Attorney, Agent, or Firm* — Foley & Lardner LLP

(57) ABSTRACT

Described embodiments provide systems, methods and computer implemented instructions for resuming virtual computing sessions. A first device detects a disconnection via a primary communication channel from a server hosting a virtual computing session. The first device identifies a second device paired with the first client device. The first device transmits a request to enable a hotspot function of the second client device. The first device receives an indication that the hotspot function of the second client device is enabled. The first device resumes, in communication with the second device, access to the virtual computing session hosted by the server via a secondary communication channel through the hotspot function of the second device.

20 Claims, 7 Drawing Sheets

PROVIDING UNINTERRUPTED ACCESS TO RESOURCES VIA A MOBILE HOTSPOT CONNECTION

FIELD OF THE DISCLOSURE

This application generally relates to providing uninterrupted access to resources via a mobile hotspot connection. In particular, a virtual delivery agent on a client device providing a virtual computing session hosted by a server can detect that a primary network connection is disconnected, and instruct a second client device to enable a hotspot functionality in order to resume the virtual computing session hosted by the server through a secondary communication channel via the second client device.

BACKGROUND

In a client-server virtual computing environment, a server can host or execute a virtual machine, and a client device can access the virtual machine through a network to provide a user interface to access, control or otherwise use the virtual machine. However, due to network connectivity issues, access to the virtual machine via the network can be disconnected, thereby terminating access to the virtual machine by the client.

SUMMARY

This Summary is provided to introduce a selection of concepts in a simplified form that are further described below in the Detailed Description. This Summary is not intended to identify key features or essential features, nor is it intended to limit the scope of the claims included herewith.

This technical solution is generally directed to providing uninterrupted access to resources via a mobile hotspot connection. In particular, a virtual delivery agent on a client device providing a virtual computing session hosted by a server can detect that a primary network connection is disconnected, and instruct a second client device to enable a hotspot functionality in order to resume the virtual computing session hosted by the server through a secondary communication channel via the second client device.

Client devices can communicate with servers through a network to perform various tasks, including, for example, transferring files, providing a virtual desktop session, streaming audio or video content, or conducting a virtual meeting. However, when the network connection is interrupted, the task can be inadvertently terminated, blocked or paused, thereby preventing the client or the server from continuing to perform the task, or causing one or more programs executing on the client or the server to crash, freeze, or hang due to missing or inaccessible data or instructions. These network connectivity issues can result in wasted or excessive computing resource utilization. For example, a client device, such as a laptop, may continue to consume battery power while repeatedly attempting to regain access to the network or server. The server, similarly, may continue to execute and host the virtual computing session (e.g., virtual machine, virtual desktop session, or virtual meeting), even though the client device is unable to access the virtual computing session. Further, certain programs executing on the client or server may not be configured with robust error handling, which can result in exceptions or faults occurring on the client device or server.

In the event of an interruption to a network connection while the client device is performing a task or computing operation (e.g., file download/upload, internet access, video streamlining, virtual desktop session or virtual meeting session), the task or operation is stopped and the client device may wait or pause the operation for several moments until the network connection is re-established or a new network connection is established. For example, a user of a first client device may lose network access. The user may enable a hot spot functionality on a second device that has network access. The user can then connect the first device to the second device to access the network via the second device. The first client device can execute the task or operation via the network access provided by the second device. Thus, systems and methods of this technical solution can provide uninterrupted network connection, file transfer, virtual desktop sessions, or data streaming via a mobile network without excessive network or battery resource consumption on a smartphone.

At least one aspect of this technical solution is directed to a method of resuming virtual computing sessions. The method can be performed by a first virtual delivery agent that provides a virtual computing session on a first client device. The method can include the first virtual delivery agent detecting a disconnection via a primary communication channel from a server hosting the virtual computing session. The method can include the first virtual delivery agent identifying a second client device paired with the first client device. The first virtual delivery agent can identify the second client device responsive to detecting the disconnection. The method can include the first virtual delivery agent transmitting, to a second virtual delivery agent executed by the second client device, a request to enable a hotspot function of the second client device. The method can include the first virtual delivery agent receiving, responsive to the request, an indication that the hotspot function of the second client device is enabled. The method can include the first virtual delivery agent resuming access to the virtual computing session hosted by the server via a secondary communication channel through the hotspot function of the second client device. The first virtual delivery agent can resume access in communication with the second virtual delivery agent.

In some implementations, the first virtual delivery agent and the second virtual delivery agent are paired with one another via a short-range wireless interconnection. The first client device can retrieve, from memory of the first client device, identifiers for second client devices previously paired with the primary client device. The first virtual delivery agent can determine a wireless signal strength between the first client device and each of the second client devices. The first virtual delivery agent can select the second client device based on a comparison of the wireless signal strength between the first client device and each of the plurality of second client devices.

The second client device can include a cellular radio system. The first client device may not have, or lack, a cellular radio system. The method can include the first virtual delivery agent establishing the secondary communication channel to the server hosting the virtual computing session via the hotspot function formed from a short-range wireless interconnection between the first client device and the second client device, and a cellular wireless connection between the second client device and the server.

Subsequent to the disconnection and accessing the server via the hotspot function of the second client device, the method can include the first virtual delivery agent detecting a resumption of access to the server hosting the virtual computing session via the primary communication channel. The first virtual delivery agent can transmit an indication to the second client device to disable the hotspot function and terminate the secondary communication channel to the server. The first virtual delivery agent can transmit this indication responsive to detecting the access to the network via the primary communication channel.

The method can include the first virtual delivery agent receiving, responsive to the request to enable the hotspot function, a network identifier and authentication credentials from the second virtual delivery agent. The first virtual delivery agent can use the network identifier and the authentication credentials to establish the secondary communication channel to the server via the second client device.

The method can include the first virtual delivery agent initiating a file transfer via the primary communication channel. The first virtual delivery agent can detect, subsequent to initiation of the file transfer and prior to completion of the file transfer, the disconnection from the server via the primary communication channel. The first virtual delivery agent can resume, in communication with the second virtual delivery agent, the file transfer via the secondary communication channel to the server via a short-range wireless interconnection between the first client device and the second client device, and a cellular wireless connection between the second client device and the server.

The method can include the first virtual delivery agent switching from a first application configured for the primary communication channel to a second application configured for communication with the second virtual delivery agent responsive to establishing the secondary communication channel. The first client device can be or include a laptop computing device, and the second client device can be or include a mobile phone.

The method can include the first virtual delivery agent providing, via the primary communication channel, a virtual desktop session hosted by the server. The first virtual delivery agent can detect, subsequent to provision of the virtual desktop session via the primary communication channel, the disconnection from the server via the primary communication channel. The first virtual delivery agent can provide, to the second virtual delivery agent responsive to establishing the secondary communication channel, an indication to relaunch the virtual desktop session. The first virtual delivery agent can relaunch, through the secondary communication channel to the server via a short-range wireless interconnection between the first client device and the second client device. The first virtual delivery agent can relaunch the virtual desktop session responsive to the second virtual delivery agent receiving, from the server, a configuration file for the virtual desktop session.

At least one aspect of this technical solution is directed to a system to resume network access. The system can include a first virtual delivery agent executed by a first client device having one or more processors. The first virtual delivery agent can provide, via a primary communication channel with a server, a virtual computing session hosted by the server. The first virtual delivery agent can detect a disconnection from the server via the primary communication channel. The first virtual delivery agent can identify, responsive to detection of the disconnection, a second client device paired with the first client device. The first virtual delivery agent can transmit, to a second virtual delivery agent executed by the second client device, a request to enable a hotspot function of the second client device. The first virtual delivery agent can receive, responsive to the request, an indication that the hotspot function of the second client device is enabled. The first virtual delivery agent can resume, in communication with the second virtual delivery agent, access to the virtual computing session hosted by the server via a secondary communication channel through the hotspot function of the second client device.

In some implementations, the first delivery agent can pair with the second virtual delivery agent via a short-range wireless interconnection. The first client device can pair with the second client device via the short-range wireless interconnection. The first virtual delivery agent can retrieve, from memory of the first client device, identifiers for second client devices previously paired with the primary client device. The first virtual delivery agent can determine a wireless signal strength between the first client device and each of the second client devices. The first delivery agent can select the second client device based on a comparison of the wireless signal strength between the first client device and each of the plurality of second client devices.

The second client device can include a cellular radio system, and the first client device can lack a cellular radio system. The first virtual delivery agent can establish the secondary communication channel to the server hosting the virtual computing session via the hotspot function formed from a short-range wireless interconnection between the first client device and the second client device, and a cellular wireless connection between the second client device and the server. The first virtual delivery agent can detect, subsequent to the disconnection, a resumption of access to the server hosting the virtual computing session via the primary communication channel. The first virtual delivery agent can transmit, responsive to detecting the access to the network via the primary communication channel, an indication to the second client device to disable the hotspot function and terminate the secondary communication channel to the server.

The first virtual delivery agent can receive, responsive to the request to enable the hotspot function, a network identifier and authentication credentials from the second virtual delivery agent. The first virtual delivery agent can use the network identifier and the authentication credentials to establish the secondary communication channel to the server via the second client device.

The first virtual delivery agent can initiate a file transfer via the primary communication channel. The first virtual delivery agent can detect, subsequent to initiation of the file transfer and prior to completion of the file transfer, the disconnection from the server via the primary communication channel. The first virtual delivery agent can communicate with the second virtual delivery agent to resume the file transfer via the secondary communication channel to the server via a short-range wireless interconnection between the first client device and the second client device, and a cellular wireless connection between the second client device and the server.

The first virtual delivery agent can provide, via the primary communication channel, a virtual desktop session hosted by the server. The first virtual delivery agent can detect, subsequent to provision of the virtual desktop session via the primary communication channel, the disconnection from the server via the primary communication channel. The first delivery agent can provide, to the second virtual delivery agent responsive to establishing the secondary communication channel, an indication to relaunch the virtual desktop session. The first delivery agent can relaunch, through the secondary communication channel to the server via a short-range wireless interconnection between the first client device and the second client device, the virtual desktop session. The first delivery agent can relaunch the virtual desktop session responsive to the second virtual delivery agent receiving, from the server, a configuration file for the virtual desktop session.

At least one aspect of this technical solution is directed to a non-transitory computer readable medium storing program instructions. The program instructions can cause one or more processors to execute a first virtual delivery agent on a first client device. The program instructions can cause the one or more processors to provide, by the first virtual delivery agent via a primary communication channel with a server, a virtual computing session hosted by the server. The program instructions can cause the one or more processors to detect, by the first virtual delivery agent, a disconnection from the server via the primary communication channel. The program instructions can cause the one or more processors to identify, by the first virtual delivery agent, responsive to detection of the disconnection, a second client device paired with the first client device. The program instructions can cause the one or more processors to transmit, by the first virtual delivery agent to a second virtual delivery agent executed by the first client device, a request to enable a hotspot function of the second client device. The program instructions can cause the one or more processors to receive, by the first virtual delivery agent responsive to the request, an indication that the hotspot function of the second client device is enabled. The program instructions can cause the one or more processors to resume, by the first virtual delivery agent in communication with the second virtual delivery agent, access to the virtual computing session hosted by the server via a secondary communication channel through the hotspot function of the second client device.

The program instructions can cause the one or more processors to retrieve, from memory of the primary client device, a plurality of identifiers for a plurality of secondary client devices previously paired with the primary client device. The program instructions can cause the one or more processors to determine a wireless signal strength between the primary client device and each of the plurality of secondary client devices. The program instructions can cause the one or more processors to select the secondary client device based on a comparison of the wireless signal strength between the primary client device and each of the plurality of secondary client devices.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

This technical solution is directed to systems and methods for

Section A describes a computing environment which may be useful for practicing embodiments described herein; and Section B describes systems and methods for A. Computing Environment Prior to discussing the specifics of embodiments of the systems and methods of an appliance and/or client, it may be helpful to discuss the computing environments in which such embodiments may be deployed.

Figure 1A:
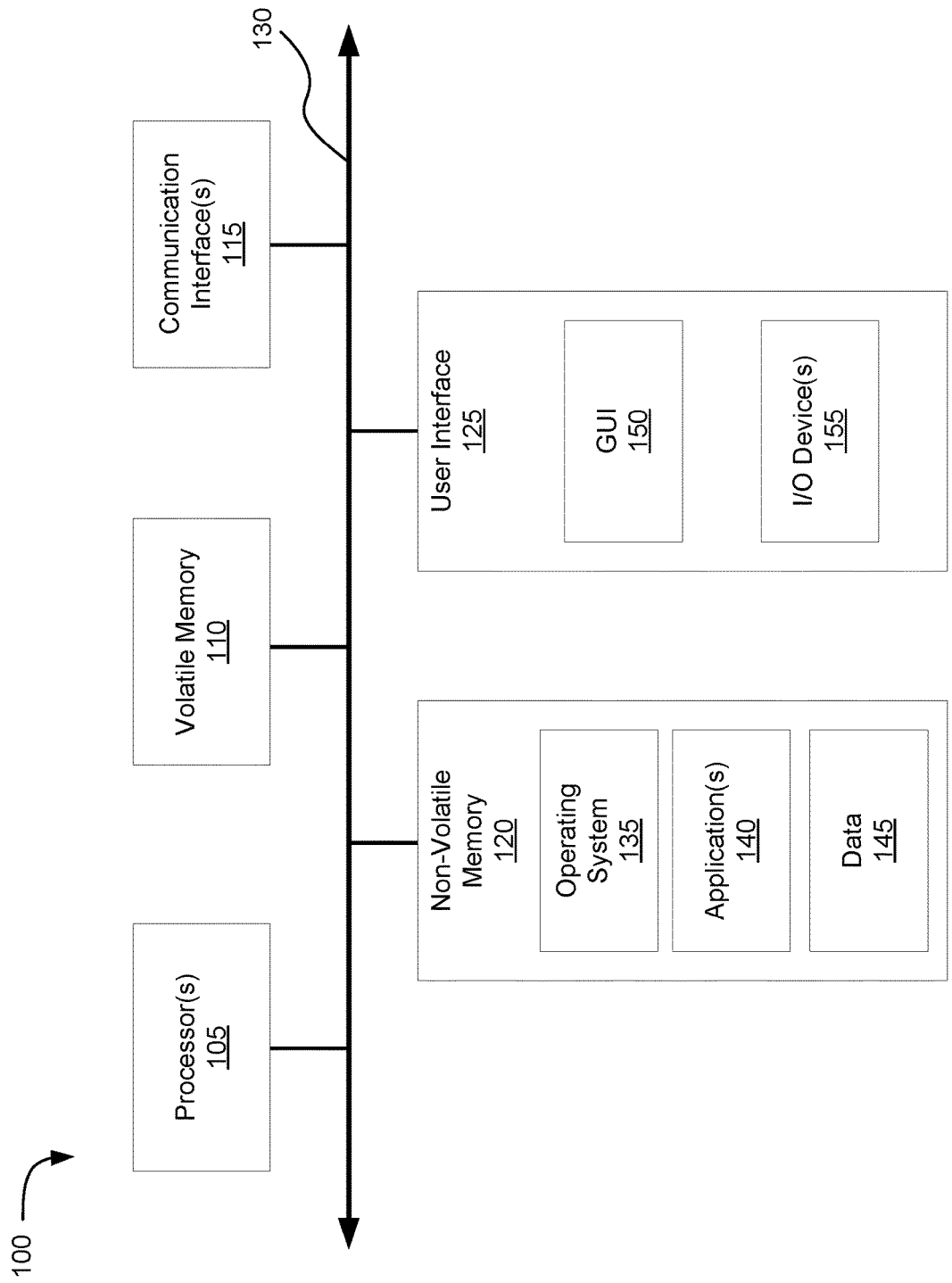
FIG. 1A is a block diagram of embodiments of a computing device.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
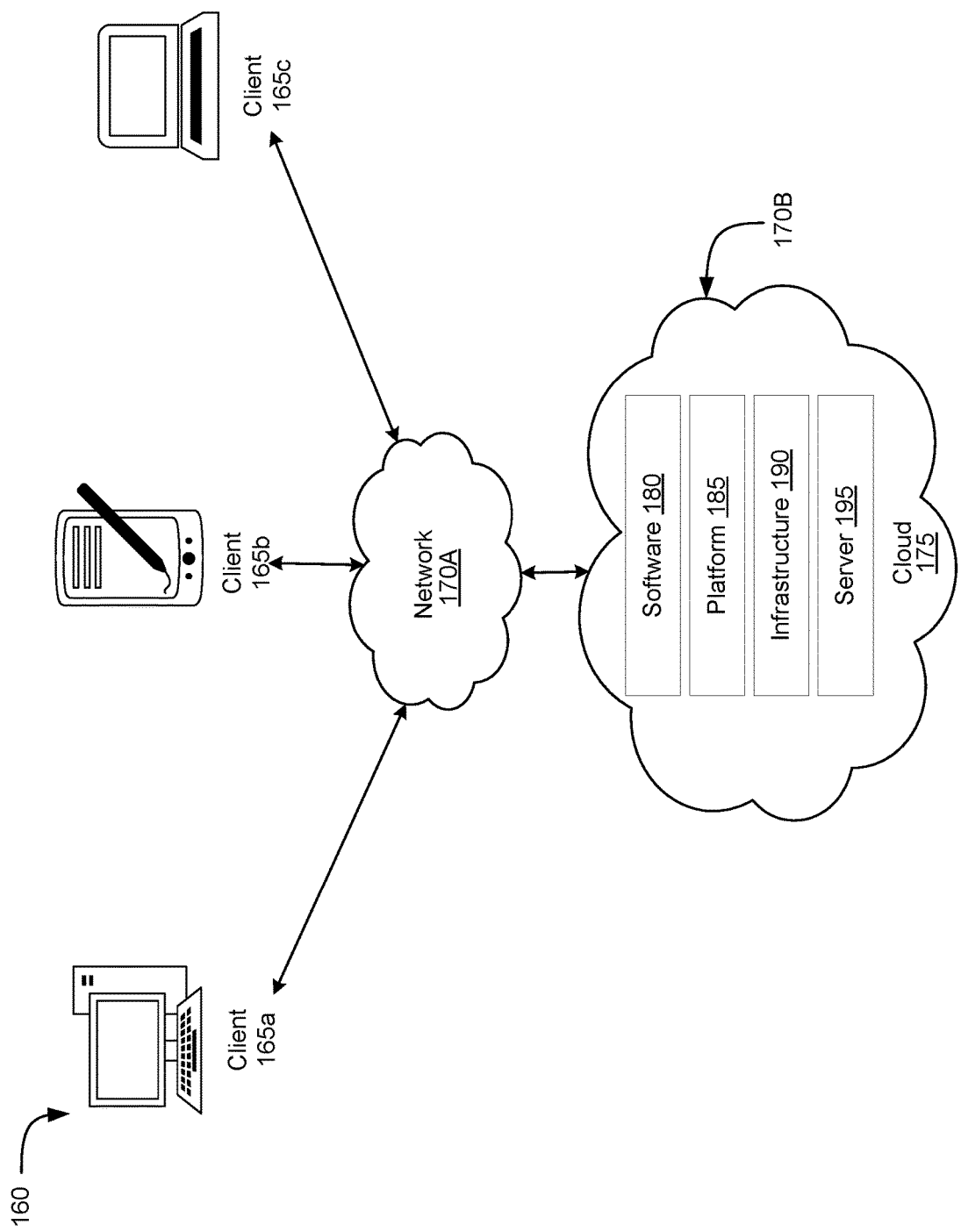
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Translating API Query Language Operations to SQL Operations

This technical solution is generally directed to providing uninterrupted access to resources via a mobile hotspot connection. Client devices can communicate with servers through a network to perform various tasks, including, for example, transferring files, providing a virtual desktop session, streaming audio or video content, or conducting a virtual meeting. However, when the network connection is interrupted, the task can be inadvertently terminated, blocked or paused, thereby preventing the client or the server from continuing to perform the task, or causing one or more programs executing on the client or the server to crash, freeze, or hang due to missing or inaccessible data or instructions. These network connectivity issues can result in wasted or excessive computing resource utilization. For example, a client device, such as a laptop, may continue to consume battery power while repeatedly attempting to regain access to the network or server. The server, similarly, may continue to execute and host the virtual computing session (e.g., virtual machine, virtual desktop session, or virtual meeting), even though the client device is unable to access the virtual computing session. Further, certain programs executing on the client or server may not be configured with robust error handling, which can result in exceptions or faults occurring on the client device or server.

In the event of an interruption to a network connection while the client device is performing a task or computing operation (e.g., file download/upload, internet access, video streamlining, virtual desktop session or virtual meeting session), the task or operation is stopped and the client device may wait or pause the operation for several moments until the network connection is re-established or a new network connection is established. For example, a user of a first client device may lose network access. The user may enable a hot spot functionality on a second device that has network access. The user can then connect the first device to the second device to access the network via the second device. The first client device can execute the task or operation via the network access provided by the second device.

This technical solution reduces the delay and additional steps taken when network access is lost by providing a client application on both the first client device and the second client device. The technical solution includes a client application such as a virtual delivery agent configured and installed on both the first client device and the second device. For example, a first client device can include a laptop computing device, and a second client device can include a mobile telecommunication device, such as a smartphone. The laptop can be connected to the smart phone via a short-range wireless interconnection, such as Bluetooth. When the laptop is disconnected from the internet due to network failure, the client application (e.g., virtual delivery agent) executing on the laptop can send a request to the corresponding client application executing on the smartphone to enable a hotspot function of the smartphone. The smartphone can send an indication to the client application on the laptop indicating that the hotspot function has been enabled. The client application on the smartphone can send the indication responsive to the smartphone enabling the hotspot function. The client application on the laptop can connect to the hotspot function on the smartphone responsive to receiving the indication from the smartphone that the hotspot function is enabled. The client application can connect using an encrypted service set identifier ("SSID"). The client application can send credentials over Bluetooth to connect using the SSID. Since the client application on the laptop device can automatically request the smartphone to enable the hotspot function responsive to the laptop device losing network connection, the battery utilization of the smartphone can be reduced or minimized since the smartphone may only enable the hotspot function when requested by the client application of the laptop device. The laptop client device can detect when a primary network connection is re-established, and cause the smartphone to disable the hotspot function. Indeed, a hotspot function may utilize excessive battery or computing resource utilization, so providing a client application on both the laptop and smartphone that communicate with one another to invoke the hotspot function responsive to network interruptions can reduce battery and hotspot function utilization relative to a system that may persistently enable the hotspot function.

In some cases, the client application on the laptop device may be connected to multiple secondary devices at the same time. There may be multiple second devices that are within Bluetooth range of the first client device. The client application on the first device can store identifiers or addresses (e.g., a Bluetooth 48-bit address) for each of the secondary devices, and detect when the secondary devices are within range. The client application on the first device can then select one of the secondary devices based on a metric (e.g., Bluetooth signal strength, cellular signal strength of the secondary device, remaining battery power of the secondary device, operating system version of the secondary device, network utilization by the secondary client device, etc.). The first client device can prioritize the secondary device based on the metric (e.g., select the secondary device that is closest to the laptop device). When the first client device detects that the primary connection is back online, the first client device can switch back to the primary connection without causing any interruption. The first client device can further instruct the secondary client device to disable or terminate the hotspot function.

For example, to provide an uninterrupted file transfer, the client application on the laptop can initiate the file transfer. Upon detecting a network interruption, the client application on the laptop can send the file via Bluetooth to the client application on the smartphone as well as provide an upload percentage. The client application on the smartphone, which may be a different version or type of application than the client application on the laptop device, can then send the remainder of the file to the server for storage through a mobile network.

In another example involving interruption of a virtual desktop session, the client application (e.g., virtual delivery agent) can enable mobile hotspot in the mobile device and restore network access. Since the virtual delivery agent ("VDA") can detect the client device is disconnected, the VDA can use a policy to send the appropriate file (e.g., an independent computing architecture file based on a presentation services protocol) to the corresponding workspace application running on the mobile device, thus relaunching the session through the mobile device.

Thus, systems and methods of this technical solution can provide uninterrupted network connection, file transfer, virtual desktop sessions, or data streaming via a mobile network without excessive network or battery resource consumption on a smartphone.

Figure 2:
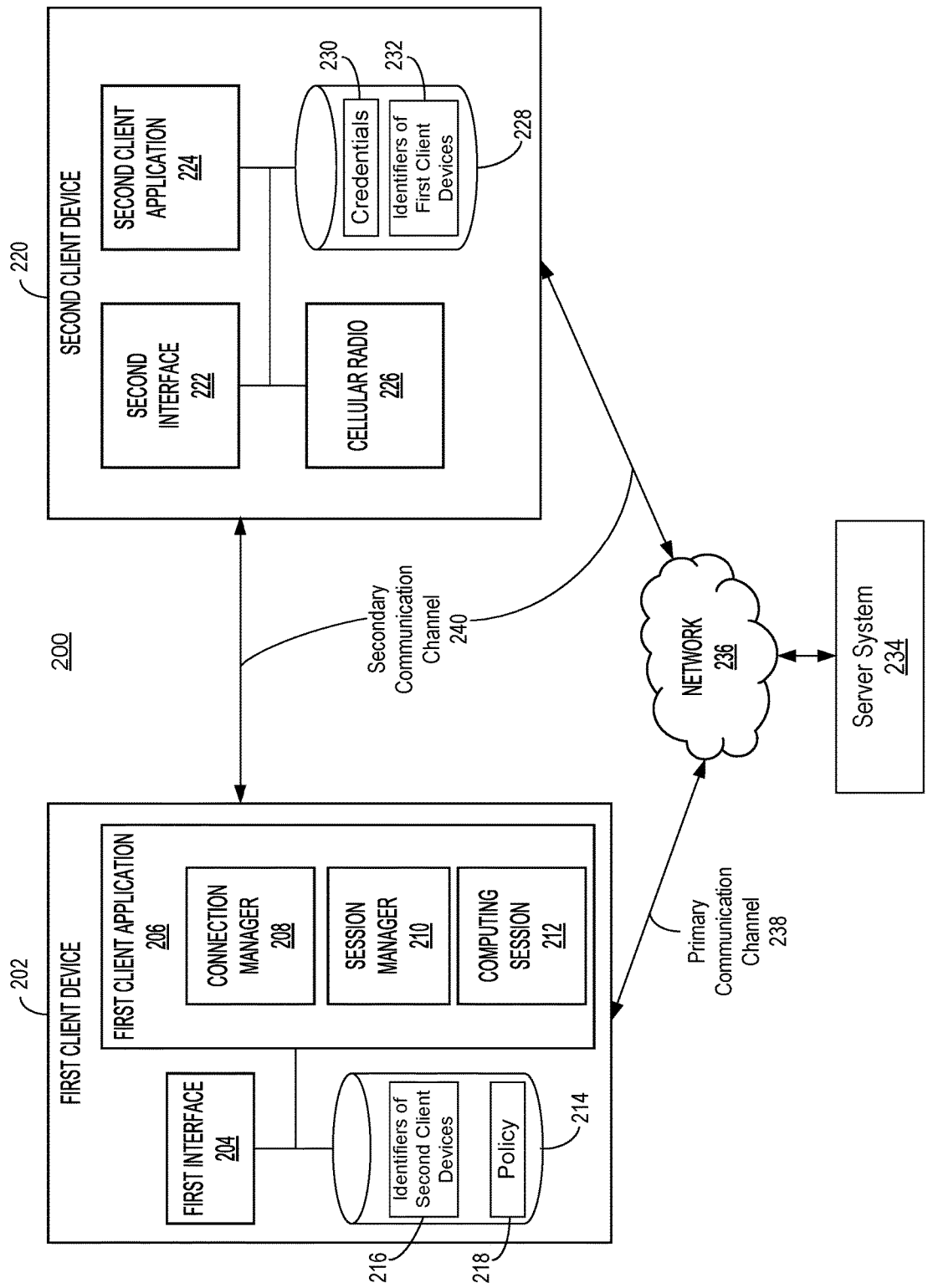
FIG. 2 depicts an example block diagram of a system to resume network access, in accordance with an implementation.

Referring to FIG. 2, depicted is a block diagram of an example system 200 for resuming a computing session. The system 200 can include, use, interface with or otherwise communicate with at least one first client device 202, at least one second client device 220, at least one network 236, or at least one server system 234. The first client device 202 can include at least one first interface 204, at least one first client application 206, or at least one data repository 214. The first client application 206 can include or execute at least one connection manager 208, at least one session manager 210, or at least one computing session 212. The data repository 214 can include, store or otherwise manage or maintain identifiers of second client devices 216 or policies 218. The second client device 220 can include at least one second interface 222, at least one second client application 224, at least one cellular radio system 226, or at least one data repository 228. The second data repository 228 can include, store or otherwise manage or maintain credentials 230 and identifiers of first client devices 232.

Each of the elements or entities of system 200 is implemented in hardware, or a combination of hardware and software, in one or more embodiments. Each component of the system 200 may be implemented using hardware or a combination of hardware or software detailed above in connection with FIGS. 1A-1B. For instance, each of these elements or entities can include any application, program, library, script, task, service, process or any type and form of executable instructions executing on hardware of system 100 or 160. The hardware includes circuitry such as one or more processors in one or more implementations.

The network 236 can include computer networks such as the Internet, local, wide, metro or other area networks, intranets, satellite networks, other computer networks such as voice or data mobile phone communication networks, and combinations thereof. The network 236 can include one or more component or functionality of network 170A depicted in FIG. 1B. The server system 234 of the system 200 can communicate via the network 236, for instance with the first client device 202 and the second client device 220. The network 236 may be any form of computer network that relays information between the first client device 202, second client device 220 and server system 234. The network 236 may include the Internet or other types of data networks, such as a local area network (LAN), a wide area network (WAN), a cellular network, a satellite network, or other types of data networks. The network 236 may also include any number of computing devices (e.g., computers, servers, routers, network switches, etc.) that are configured to receive or transmit data within the network 236. The network 236 may further include any number of hardwired or wireless connections. The first client device 202 or second client device 220 may communicate wirelessly (e.g., via WiFi, cellular, radio, etc.) with a transceiver that is hardwired (e.g., via a fiber optic cable, a CAT5 cable, etc.) to other computing devices in the network 236. The first client device 202 or second client device 220 may also communicate wirelessly with the computing devices of the network 236 via a proxy device (e.g., a router, network switch, or gateway).

The server system 234 can include, for example, one or more data sources, web servers, or databases. The server system 234 can include one or more component or functionality of cloud 175, such as software 180, platform 185, infrastructure 190, or server 195. the server system 234 can provide data files, virtual computing sessions, cloud storage, streaming multimedia content, data backup, or other functionality to a client devices 202 and 220 via network 236. The server system 234 can provide resources that can include cloud connectors (e.g., authentication component, proxy component, provisioning component, or identity component). The server system 234 can provide hypervisors that can provide server virtual delivery agents ("VDAs") and client VDAs. Thus, the server system 234 can include various components that facilitate delivering applications using virtual machines.

The first client device 202, second client device 220 and server system 234 can include at least one processor and a memory, e.g., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The first client device 202, second client device 220 and server system 234 can include one or more computing devices or servers that can perform various functions as described herein. Client device 202 and 220 can include one or more component or functionality of client 165*a-n*.

Computing services or resources can be provided via a virtual application or virtual desktop, for example, in a client-server architecture. The virtual application or virtual desktop can provide improved security relative to native applications executing on a client device (e.g., first client device 202 or second client device 220), while also providing access to computing resources from any client device. The virtual application or virtual desktop can be delivered to a client device 202 or 220 by server system 234 through network 236. Each physical or virtual machine (e.g., first client device 202, second client device 220, or server system 234) that delivers applications and desktops via the server system 234 can have a client application such as a VDA. The VDA can register with a connector component of the cloud computing environment. After registration, connections can be brokered from those resources to client devices 202 and 220. VDAs can establish and manage the connection between the machine and the client device, and apply policies 218 that are configured for the computing session 212. The VDA can communicate session information to the connector component through a broker agent in the VDA. The broker agent can hosts multiple plugins and collect real-time data. VDAs can be available for server and desktop operating systems. VDAs can allow one or more client devices 202 or 222 to connect to the server or cloud computing environment at one time. VDA can refer to the agent and the physical or virtual machine on which it is installed.

The first client device 202 can refer to or include, for example, a desktop computer, laptop computer, tablet computer, or other computing device. The second client device 220 (which can be referred to as a secondary computing device) can refer to or include, for example, a smartphone, a mobile device, or other computing device. The first client device 202 can be a different type of device than the second client device 220. The first client device 202 can have different capabilities, configurations, or functionality than the second client device 220. For example, the first client device 202 can lack a cellular radio system, whereas the second client device 220 can include a cellular radio system 226. The second client device 220 can have access to different types of networks relative to the first client device 202. For example, the first client device 202 can have access to a WiFi network but lack access to a cellular data network, whereas the second client device can have access to both a WiFi network and a cellular data network. In some cases, the first client device 202 can also include a cellular radio system, but it may be disabled or not enabled.

The first client device 202 may have a different type of operating system than the second client device 220. For example, the first client device 202 can execute a desktop operating system, whereas the second client device 220 can execute a mobile operating system. The first client application 206 executing on the first client device 202 can be compatible with or configured for the desktop operating system of the first client device 202. For example, the first client application 206 can be a desktop client application. The second client application 224 can be compatible or configured for the mobile operating system of the second client device 220. For example, the second client application 224 can be a mobile client application. The first and second client application 206 and 224 can interface with server system 234 to provide a computing session 212, which can include the performance of one or more computing tasks or functions, such as providing a virtual computing session, virtual desktop, virtual application, streaming media content, file transfers, among other functionality.

The first client device 202 can include a first interface 204. The first interface 204 can include one or more component or functionality depicted in FIG. 1A, such as a user interface 125, GUI 150, or I/O devices 155. The first interface 204 can include hardware, such as a communication port, radio, antenna, or network interface. The second client device 220 can include a second interface 222. The second interface 222 of the second client device 220 can include one or more component or functionality depicted in FIG. 1A, such as a user interface 125, GUI 150, or I/O devices 155. The second interface 222 of the second client device 220 can include hardware, such as a communication port, radio, antenna, or network interface. The first interface 204 on the first client device 202 can be similar to the second interface 222 of the second client device 220. The first interface 204 on the first client device 202 can be a different type of interface as the second interface 222 on the second client device 220. In some cases, the first interface 204 can be configured differently for the first client device 202 as compared to the second interface 222 of the second client device 220. For example, the second interface 222 on the second client device 220 can include a mobile graphical user interface and the first interface 204 on the first client device 202 can include a desktop graphical user interface. The desktop graphical user interface can provide different or additional functionality relative to the mobile graphical user interface. The desktop graphical interface can include additional buttons or user interface elements relative to the mobile graphical interface. The desktop graphical user interface can be configured or optimized for keyboard and mouse input, whereas a mobile graphical user interface can be configured or optimized for touchscreen input.

The first client device 202 can include a first client application 206 designed, constructed and operational to provide a computing session 212. The first client application 206 can include or be referred to as a virtual delivery agent. The first client application 206 can include or provide a connection manager 208, session manager 210 and computing session 212. The computing session 212 can include, for example, a virtual desktop session, a virtual application, or file transfer. The second client application 224 can include one or more component or functionality of the first client application 206.

The first client application 206 can include a connection manager 208 designed, constructed and operational to establish a connection with server system 234 via network 236 to provide the computing session 212. The connection manager 208 can establish or maintain a primary communication channel 238 between the first client device 202 and the network 236. The connection manager 208 can establish or maintain the primary communication channel 238 between the first client device 202 and the server system 234 via network 236. The connection manager 208 can identify a network that is available to the first client device 202 and establish the connection directly between the first client device 202 and the server system 234 via network 236. This direct connection between the first client device 202 and the network 236 can be referred to as a primary communication channel 238. The primary communication channel 238 can exclude the second client device 220. For example, the primary communication channel 238 can include routing data packets directly through network 236 between the first client device 202 and the server system 234, without routing data packets to the second client device 220.

The connection manager 208 can use a WiFi network to communicate with server system 234 via network 236. The primary communication channel 138 can be formed from a WiFi network connection. The connection manager 208 can use a wired Ethernet to communicate with server system 234 via network 236. The connection manager 208 can use one or more communication protocols to establish the primary communication channel 238 between the first client device 202 and the server system 234 via network 236 to provide the computing session 212.

The connection manager 208 can detect a disconnection between the first client device 202 and the network 236. The connection manager 208 can detect a disconnection between the first client device 202 and the server system 234 via the network 236. For example, the connection manager 208 can detect a disconnection via the primary communication channel 238 to the server system 234 hosting a virtual computing session, virtual desktop, virtual application, cloud storage, or providing a file transfer. The connection manager 208 can detect the disconnection using one or more techniques. For example, the connection manager 208 can perform a network connection status check. The connection manager 208 can ping a network interface card (e.g., first interface 204 or communication interface 115) of the first client device 202.

The connection manager 208 can determine the disconnection responsive to or based on a status in the computing session 212. The connection manager 208 can determine a fault, crash, pause, freeze or other performance issue in the computing session 212, and determine that the performance issue is a result of disconnection to the server system 234 via the primary communication channel. For example, the connection manager 208 can determine that the computing sessions 212 is a file transfer (an upload or download) and the file transfer percentage is not increasing or staying the same. The connection manager 208 can receive an indication from the computing session 212 of a potential disconnection. For example, the computing session 212 can indicate that a graphical user interface has not been updated responsive to user input at the first client device 202, that the computing session 212 has not received a response from the server system 234 to a request made by the user of the first client device 202, or a file transfer percentage has not changed.

The connection manager 208 can verify the disconnection of the primary communication channel. The connection manager 208 can verify the disconnection of the primary communication channel responsive to the indication of the disconnection associated with the computing session 212 or received from the computing session 212. The connection manager 208 can perform a verification process to determine that the primary communication channel has been disconnected, and that the issue is not due to an issue with the server system 234 itself. For example, the server system 234 itself may have a fault or issue that affects the performance of the computing session 212, but this fault or issue may not be due to a disconnection in the primary communication channel. Thus, to avoid excessive battery usage or consumption or other computing resource utilization due to requesting the second client device 220 to enable a hotspot function, the connection manager 208 can first determine there is a disconnection in the primary communication channel.

To verify the disconnection in the primary connection channel 238, the connection manager 208 can ping one or more servers that are remote from or separate from the server system 234. The connection manager 208 can ping a third-party server, such as a server of an internet service provider. The connection manager 208 can ping a default server that can serve as a network connection test server. The connection manager 208 can conduct a network speed test to determine the bandwidth of the primary communication channel or the bandwidth to the network 236 accessible to the first client device 202. The connection manager 208 can determine a bit error rate, packet loss, latency or other network characteristics associated with network 236.

The connection manager 208 can determine the disconnection based on a comparison of a network characteristic, measurement, parameter or metric with a threshold. The connection manager 208 can use a policy 218 to determine the disconnection. The policy 218 can include a disconnection policy. For example, a disconnection policy in the primary communication channel can refer to bit error rate greater than or equal to a bit error rate threshold, a packet loss greater than or equal to a packet loss threshold, a latency greater than or equal to a latency threshold, or a ping time greater than or equal to a ping time threshold. The threshold can be a fixed threshold, a user preference threshold, a threshold requested by an application, a threshold requested by the server system 234, or a dynamic threshold based on the type of task performed by the computing session 212. For example, to provide a smooth user experience for a virtual desktop or virtual application, the network latency threshold may be lower as compared to a file transfer. In another example, to transfer a large file (e.g., greater than 25 megabytes, greater than 50 megabytes, 100 megabytes, 200 megabytes, 500 megabytes, or more) in a reasonable amount of time (e.g., less than 2 minutes, less than 5 minutes, less than 10 minutes, less than 15 minutes, less than 30 minutes, less than 60 minutes, or other amount of time), the bandwidth threshold may be higher as compared to providing a virtual desktop, which may utilize less bandwidth. In another example, the thresholds used for providing streaming media content can vary based on the type of content, such as a resolution of a streaming video. The connection manager 208 can request a higher bandwidth and lower latency for streaming video at 4K resolution, as compared to streaming video at 480p resolution, for example. Thus, the connection manager 208 can use a disconnection policy to select one or more thresholds for one or more network characteristics based on the type of computing session 212 or type of content, and determine a disconnection.

The connection manager 208 can identify a second client device 220. The connection manager 208 can identify the second client device 220 responsive to detecting the disconnection in the primary communication channel 238. The connection manager 208 can identify one or more second client devices 220. The connection manager 208 can identify multiple smartphones that can be referred to as second client devices 220. The connection manager 208 can identify multiple devices containing cellular radio systems 226, each of which can be referred to as a second client device 220. The connection manager 208 can perform a lookup in identifiers 216 data structure stored in data repository 214 to obtain one or more identifiers 216 or addresses for the one or more second client devices 220. The identifiers 216 can refer to unique identifiers of second client devices 220 that have been paired with the first client device 202. Identifiers 216 can include alphanumeric values, device names, account identifiers, or other identifiers of devices. The identifiers 216 can include a device identifier or device ID, such as a distinctive number associated with a smartphone or other handheld device. The second client device 220 can establish a device identifier during a first boot of the second client device 220. The identifier 216 can include a mobile device identifier, a mobile equipment identifier, an internet protocol address, a unique operating system identifier, a unique client application identifier, a username, or an account identifier. The identifier 216 can correspond to the physical device or hardware component of the client device (e.g., a media access control "MAC" address uniquely identifying a wireless transmitter such as a Bluetooth or WiFi chip in the client device, or an international mobile equipment identifier "IMEI" that includes a string of numbers that is unique to a device), a communications network (e.g., a mobile identification number "MIN" or mobile subscription identifier number "MSIN" that unique identifies a mobile device to a carrier, a subscriber identification module "SIM" number that identifies and authenticates the phone and user to the network, a device IP address, or a mobile subscriber integrated services digital network number), an operating system (e.g., an identifier established by the provider of the operating system), or an application layer (e.g., an identifier established by the provider of the application, an entity associated with the application, or a user of the application).

The first client device 202 can store an identifier of a second client device 220 in the identifiers 216 data structure responsive to or subsequent to pairing with the second client device 220. Pairing can refer to establishing a link between two devices to allow communications to occur between the two devices. Pairing can occur wirelessly. For example, the first client device 202 can pair with the second client device 220 using a short-range wireless interconnection (e.g., a Bluetooth connection). Bluetooth can use short-wavelength ultra-high frequency "UHF" radio waves that can range from 2.4 to 2.485 Gigahertz "GHz". Pairing can include bonding and can be triggered by a request from the first client device 202 or the second client device 220. During pairing, the two devices can establish a relationship by creating a shared link key. If both devices store the same link key, they can be referred to as paired or bonded. The link key can be stored in the identifiers 216 data structure upon completion of a pairing process. The first client device 202 can cryptographically authenticate the identity of the second client device 220, ensuring that the second client device 220 is the same device with which the first client device 202 previously paired. Once a link is generated, the first client device 202 and second client device 220 can communicate using an asynchronous connection-less link that can be encrypted to protect exchanged data against eavesdropping. The first and second client devices 202 and 220 can use various pairing techniques, including, for example, legacy pairing, secure simple pairing, or other types of pairing using other protocols or other types of wireless protocols.

In some cases, the client application 206 can be programmed with identifiers of second client devices 220 or second client applications 224. For example, the first client application 206 and the second client application 224 can be provided by a same entity. Furthermore, the first client device 202 and the second client device 220 can be provisioned or configured by a same entity, such as an organization or company. The company can establish a set of identifiers 216 for storage in the database 214 of the first client device 202. The company can store identifiers 232 for first client devices 202 in database 228. Thus, the first client device 202 and second client device 220 can pair with one another based on pre-configured identifiers 216 and 232 stored in databases 214 and 228, respectively, by an organization or company that provisions the client devices 202 and 220.

In some cases, the first client device 202 can identify multiple second client devices 220. The first client device 202 can retrieving, from memory (e.g., data repository 214) of the first client device 202, multiple identifiers corresponding to multiple second client devices 220 that were previously paired with the first client device 202. The first client device 202 can detect that one or more of the second client devices 220 are within range of the first client device 202. For example, the first client device 202 can determine that it is possible to connect, pair, or otherwise communicate to exchange data with one or more of the second client devices 220 during a current time interval. If the connection manager 208 determines that there is only a single second client device 220 within a proximity that is suitable for establishing a data exchange communication or secondary communication channel 240, then the connection manager 208 can proceed with communicating with the second client device 220.

However, if the first client device 202 determines that there are multiple identifiers 216 of second devices stored in the data repository 214, and multiple of those second client devices 220 are within proximity of the first client device 202 or otherwise detected by the first interface 204, the connection manager 208 can execute a device selection policy from policy 218 data structure in order to select a second client device 220 with which to connect. The device selection policy can prioritize second client devices. The selection policy can be based on one or more characteristic, metric, parameter or other value associated with the second client device or based on a relationship between the second client device 220 and the first client device 202. The characteristic can include, for example, signal strength, the number of other devices the second client device 220 is paired with or servicing, battery use of the second client device 220, a software or hardware version or type of the second client device 220, historical preferences, user selection, or available network bandwidth or processing resources of the second client device 220. By selecting a second client device 220 one or more characteristics via the selection policy, the connection manager 208 can improve the likelihood that the first client device 202 can perform a computing task or resume a computing session during a disconnection from the network 236 via the primary communication channel 238.

For example, the selection policy can be based on a wireless signal strength (e.g., Bluetooth signal, WiFi signal, radio frequency signal, acoustic signal, ultrasonic signal, or other type of wireless signal). The connection manager 208 can determine the signal-to-noise ratio or amplitude or other signal strength metric for each of the second client devices 220. The connection manager 208 can select the second client device 220 having the highest signal strength. The connection manager 208 can rank the second client device 220 based on signal strength, with the highest ranked second client device 220 corresponding to the highest signal strength. Signal strength can indicate or be a proxy for the proximity of the second client device 220 to the first client device 202. Thus, the connection manager 208 can determine a wireless signal strength between the first client device 202 and each of the second client devices 220. The connection manager 208 can select the second client device 220 based on a comparison of the wireless signal strength between the first client device 202 and each of the second client devices 220 such that the selected second client device 220 corresponds to the highest wireless signal strength.

The connection manager 208 can select the second device based on the number of other devices the second client device 220 is paired with. The connection manager 208 can rank the second client devices 220 based on the number of other first client devices 202 with which the second client device 220 is paired or providing a hotspot function, with the lowest number corresponding to the highest ranked or prioritized second client device 220. For example, there may be 3 second client devices 220 as follows: second client device A providing a hotspot function to 3 devices, second client device B providing a hotspot function to 2 devices, and second client device C providing a hotspot function to zero other devices. The connection manager 208 can select second client device C because the second client C is not providing a hotspot function to any other device, thereby indicating that this device has the most available bandwidth and processing power to service the first client computing device 202.

The connection manager 208 can select the second client device 220 based on the amount of battery power that is remaining on the second client device 220, or if the second client device is connected to a power source. The connection manager 208 can rank or prioritize second client devices 220 based on whether they are connected to a power source and the amount of battery power remaining, with second client devices 220 connected to a power source ranked highest, followed by second client devices 220 having the highest remaining battery power. By selecting a second client device 220 based on power, the connection manager 208 can increase the likelihood that the second client device 220 has sufficient power to service the first client device 202 during the network disconnection.

The connection manager 208 can select the second client device 220 based on the amount of computing resource (e.g., processing power, memory, or storage) that is available on the second client device 220. The connection manager 208 can rank or prioritize second client devices 220 based on the amount of computing resource remaining, with the second client devices 220 having the most available computing resources ranked the highest. By selecting a second client device 220 based on computing resource availability, the connection manager 208 can increase the likelihood that the second client device 220 has sufficient computing resources to service the first client device 202 during the network disconnection. The connection manager 208 can select the second client device 220 based on the amount of cellular data available to the second client device 220 based on a cell phone plan of the second client device 220.

The connection manager 208 can select the second client device 220 based on an operating system version, second client application 224 version, hardware type, or model. The connection manager 208 can use a policy containing a ranking or heuristic logic. The connection manager 208 can select the second client device 220 having a software version or hardware version that is compatible with the first client device 202. The connection manager 208 can select the second client device 220 with an up-to-date software application or operating system. The connection manager 208 can select the second client device 220 having the latest hardware or being the latest model, which may indicate the best performance (e.g., fastest network access, processing capabilities, or bandwidth).

The connection manager 208 can select the second client device 220 based on user preferences or historical selections. The connection manager 208 can select the second client device 220 based on the number of previous connections with the first client device 202, or the second client device 220 that most recently connected with the first client device 202 successfully.

The connection manager 208 can generate a prompt that lists the multiple second client devices 220 to allow the user to select the second client device 220 for pairing via the user interface of the first client device 202. The connection manager 208 can provide additional information about each of the identified second client devices 220, such as an identifier, characteristic, metric, parameter, type or other information to facilitate a selection by the user of the first client device 202.

The first client application 206 can transmit a request to the second client device 220 (or second client application 224 thereof). The request can be to enable a hotspot function of the second client device 220. The first client application 206 can transmit the request to the selected second client device 220. A hotspot function can refer to providing access to a network 236 using a wireless technology, such as WiFi. The hotspot function can refer to a mobile wireless hotspot or a portable hotspot. A mobile hotspot can refer to an ad hoc wireless access point crated by the second client device 220 by sharing the cellular data available to the second client device 220. The second client device 220 can be configured with hardware and software to provide a hotspot function. The second client device 220 can provide the hotspot function via a cellular radio system 226. A cellular radio system 226 can refer to or include hardware and software to allow the second client device 220 connect to a cellular network to communicate. The cellular radio system 226 can include 3G, 4G, LTE, 5G or other types of network access. The cellular radio system 226 can include a cell phone chip, or other hardware. The second client device 220 can enable the hotspot function of the second client device 220 responsive to the request from the first client device 202. The request from the first client device 202 can cause the second client device 220 to enable, turn on, or otherwise make available a hotspot function of the second client device 220.

The hotspot function can include providing access to the network 236 using a short-range wireless interconnection, such as Bluetooth. The hotspot function can include providing access to the network 236 by providing a WiFi access point. Thus, the second client device 220 can provide the hotspot function over Bluetooth or WiFi or other wireless communication technologies.

The connection manager 208 can receive, responsive to the request, an indication that the hotspot function of the second client device 220 is enabled. The first client device 202 can further receive information that facilities the first client device 202 connecting to the wireless hotspot provided by the second client device 220, including, for example, a broadcast SSID, network identifier, or authentication or authorization credentials. The first client application 202 can use the network identifier and the authentication credentials to establish the secondary communication channel 240 to the server system 234 via the second client device 220.

The first client application 208 can establish a secondary communication channel 240 to the server system 234 hosting a computing session via the hotspot function formed from a short-range wireless interconnection between the first client device and the second client device, and a cellular wireless connection between the second client device 220 and the server system 234. For example, the second client device 220 can use the cellular radio system 226 to access network 236, and use WiFi or Bluetooth to connect with the first client device 202 and provide the first client device 202 with access to the network 236.

In some cases, the second client application 224 can perform one or more tasks to facilitate resuming a computing session 212 that was interrupted by the network connection. The first client application 206 can include a session manager 210 designed, constructed and operational to resume a virtual computing session subsequent to establishing the secondary communication channel 240 via the second client device 220. For example, the first client application 206 can include a first VDA with session manager 210 that provides a virtual desktop session or virtual application that is hosted by the server system 234. The VDA or the server system 234 can provision the virtual desktop or virtual application to the first client device 202. The VDA can detect the disconnection from the server system 234 via the primary communication channel 238. The session manager 210 can provide, to the second client application 224 (e.g., a second virtual delivery agent) and responsive to second client device 220 establishing the secondary communication channel 240, an indication to relaunch the virtual desktop session. The first VDA on the first client device 202 (e.g., via session manager 210) can relaunch, through the secondary communication channel 240 to the server system 234 via a short-range wireless interconnection (e.g., Bluetooth or WiFi between the first client device 202 and the second client device 220), the virtual desktop session responsive to the second virtual delivery agent receiving, from the server system, a configuration file for the virtual desktop session.

The server system 234 can transmit the configuration file for the virtual computing session to the second client application 224. The second client application 224 can facilitate relaunching the session using the configuration file. The first client application 206 (e.g., via session manager 210) can relaunch the virtual computing session via the second client application 224. The configuration can include an independent computing architecture ("ICA") file that is a protocol configured for an application server system such as server system 234. The protocol can provide a specification for passing data between the server and clients. The configuration file can be in a remote desktop protocol ("RDP"). Thus, the first client application 206 can relaunch, in the second client application 224, the same computing session that was disconnected on the first client device 202 using the configuration file or ICA file received by the second client application 224 from the server system 234.

For example, the first client application 206 can include a session manager designed, constructed and operational to transmit a request to the second client application 224 to relaunch the computing session 212 that includes identifying information, authentication information, credentials or other information used to relaunch the computing session 212. The second client application 224 can query the server system 234 for the data files used to relaunch the computing session 212, receive the data files, and relaunch the session on the second client device 220. The second client application 224 can execute or at least partially execute the virtual computing session. The computing session 212 can be hosted on the server system 234. The second client device 220 can act as an intermediary device for the virtual computing session between the first client device 202 and the server system 234. The second client application 224 can provide graphical output from the computing session for display on a display device coupled to the first client device 202. The second client application 224 can receive input for the computing session from the first interface 204 of the first client device 202. Thus, the second client device 220 can facilitate relaunching the virtual computing session when the first client device 202 is disconnected from the network.

The first client device 202 can resume file transfers via the second client device 220 subsequent to network disconnect. The first client application 206 can include a session manager 210 designed, constructed and operational to resume file transfer sessions, such as file uploads or downloads, upon network disconnect. For example, the first client application 206 can begin or initiate a file upload to the server system 234 via a primary communication channel 238 to the network 236. The first client application 206 can detect the disconnection from the server system 234 via the primary communication channel 238 before the file transfer is complete. The first client application 206 can detect a transfer interruption based on not being able to upload the data files or not receiving an indication of successful upload. The first client application 206 (e.g., via session manager 210) can resume the upload via the second client application 224 by establishing a secondary communication channel 240. The first client application 206 can transmit the data file to the second client application 224, and the second client application can upload the remaining portion of the data file that was not transferred before the network disconnection.

The session manager 210 can transmit only the remaining portion of the data file to the second client application 224 to cause the second client application 224 to transmit the remaining portion to the server system 234. The session manager 210 can transmit the entire data file to the second client application 224 with an indication of the percentage remaining to be transferred to allow the second client application 224 to transfer only the remaining portion.

The session manager 210 can provide to the second client application 224 information about the file transfer, such as a destination for the upload. The session manager 210 can provide additional information, such as the file name, settings for the file, read/write permissions for the file, sharing permission for the file, file path or storage location for the file on the cloud storage provided by the server system 234, or any other information that allows the second client application 224 to resume the file transfer computing session in a manner similar to the file transfer computing session 212 initiated by the first client application 206 prior to the network disconnect. The first client application 206 can transfer the data file to the second client application 224, and the second client application 224 can upload the file to the server system 234 after receiving the entire amount of the file to be uploaded. Thus, the first client application 206 can resume, in communication with the second client application 224, the file transfer via the secondary communication channel 240 to the server system 234 via a short-range wireless interconnection (e.g., Bluetooth or WiFi) between the first client device 202 and the second client device 220, and a cellular wireless connection between the second client device 220 and the server system 234.

In another example, the first client application 206 can resume a file download upon network disconnect. The second client application 224 can receive an indication of the computing session 212 that includes the file download. The second client application 224 can reestablish the computing session with the server system 234. The server system 234 can identify that this is the same computing session being resumed, and then determine the amount remaining in the file transfer, and proceed to transmit the remaining amount to the second client application 224. The second client application 224 can then send the remaining amount of the file to the first client device 202. By transferring the remaining amount of the file and not transferring the file, the present technical solution can reduce network bandwidth utilization or wastage.

In some cases, the first client device 202 can switch from a first application configured for the primary communication channel 238 to a second application configured for communication with the second virtual delivery agent (e.g., second client application 224) responsive to establishing the secondary communication channel 240. The first application may be a desktop application, and the second application may include an interface configured for the mobile operating system or mobile application of the second client device 220. The first client device 202 can execute, launch, or invoke the second application to interface, access, or otherwise communicate with the second client application 224 executed by the second client device 220. For example, the second application can provide a graphical user interface of the second client application 224 in which a virtual desktop session can be provided. The second application can refer to a mobile version of the first application, such a mobile cloud storage interface. For example, the first client device 202 can execute both a desktop version of an application as well as a mobile version of the application, or a version of the application configured to interface with a mobile device, such as second client device 220. The mobile version can include different features of functionalities, or limited features or functions, based on the features and function available via the second client device 220 (e.g., limited size of file transfers, limited ability to manipulate files or change access privileges or permissions, limited ability to delete or move files, or limited functions available in a virtual desktop or virtual application).

Thus, the first client application 206 (e.g., first VDA) can resume, in communication with a second virtual delivery agent (e.g., second client application 224), access to the virtual computing session hosted by the server system 234 via a secondary communication channel 240 through the hotspot function of the second client device 220. The first client device 202 can then detect a resumption of access to the network 236 via the primary communication channel 238 and to the server system 234 hosting the virtual computing session. The first client device 202 can transmit, responsive to detecting the access to the network 236 via the primary communication channel 238, an indication to the second client device 220 to disable the hotspot function and terminate the secondary communication channel 240 to the server system 234, thereby reducing battery and other computing resource utilization by the second client device 220. The first client device can switch back and resume the computing session.

Figure 3:
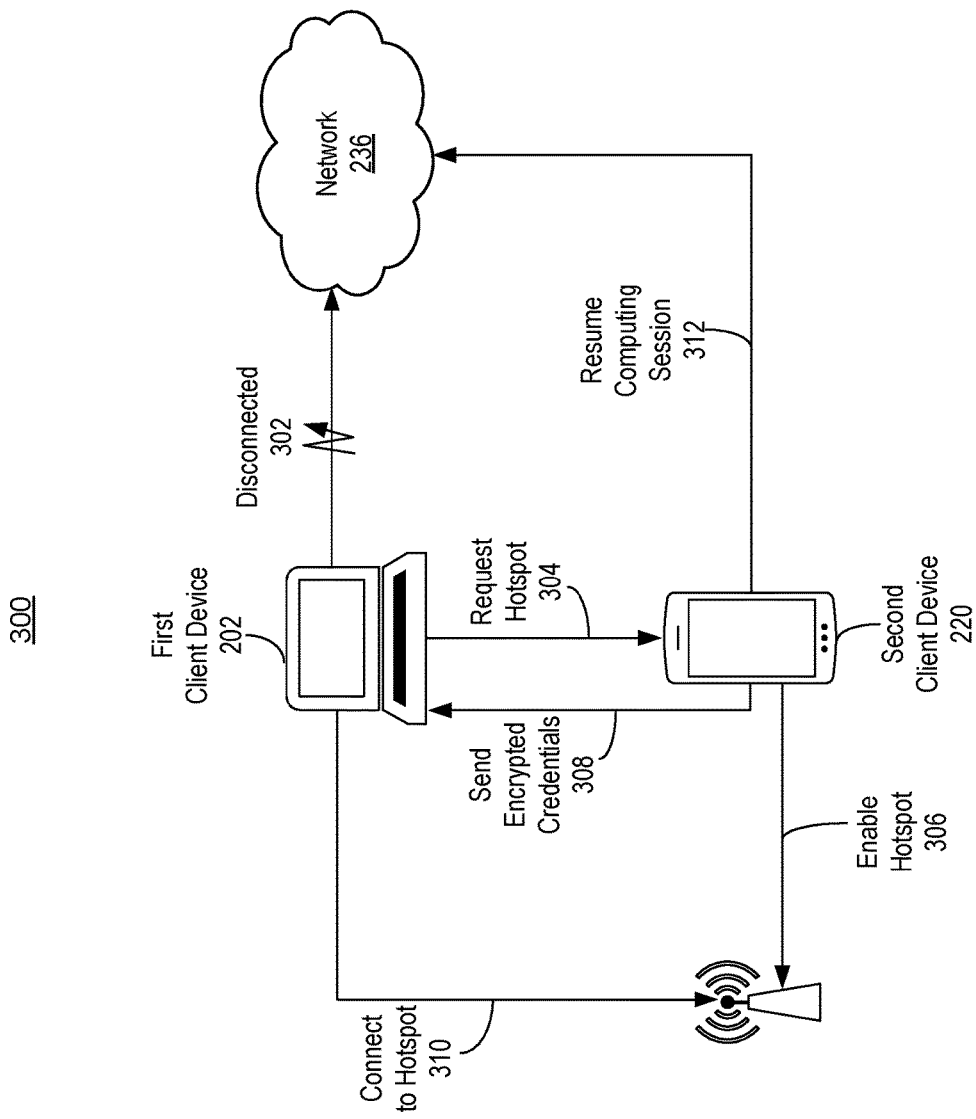
FIG. 3 depicts an example block diagram of an operation of a system to resume network access, in accordance with an implementation.

FIG. 3 depicts an example block diagram of an operation of a system to resume network access, in accordance with an implementation. The operation 300 can be performed by one or more system, component, module or functionality depicted in FIGS. 1A, 1B, and 2, including, for example, a first client device 202 and a second client device 220. In brief overview, at ACT 302, the first client device 202 can detect access to network 236 is disconnected. At ACT 304, the first client device 202 can send a request to the second client device 220 to enable a hotspot function. At ACT 306, the second client device 220 can enable the hotspot. At ACT 308, the second client device 220 can send encrypted credentials to the first client device 202 to access the hotspot. At ACT 310, the first client device 202 can connect to the hotspot provide by the second client device 220. At ACT 312, the first client device 202 can resume the virtual computing session in communication with the second client device.

Still referring to FIG. 3, and in further detail, the first client device 202 can perform an operation via network 236. The operation can include providing a virtual desktop application that is hosted by a server accessed through network 236. At ACT 302, the first client device 202 can detect access to network 236 is disconnected. The first client device 202 can detect a disconnection from the network 236 using various techniques, including, for example, the lack of a response to any request, ping, or other communication.

At ACT 304, the first client device 202 can send a request to the second client device 220 to enable a hotspot function. The first client device 202 can send the request responsive to detecting the network disconnection. The first client device 202 can identify one or more second devices 220 and use a selection policy to select a second device 220 to which to send the request.

At ACT 306, the second client device 220 can enable the hotspot. The second client device 220 can enable the hotspot responsive to the request from the first client device 202, which can be responsive to detecting the network disconnection at ACT 302. The second client device 220 can enable the hotspot function using a cellular radio system. The hotspot function can be provided via a wireless technology, such as Bluetooth or WiFi to the first client device 202. The hotspot function can provide access to network 236.

At ACT 308, the second client device 220 can send encrypted credentials to the first client device 202 to access the hotspot. The encrypted credentials can include a broadcast SSID, device identifier, username, password, link key, token, or other information used to establish a connection with the hotspot.

At ACT 310, the first client device 202 can connect to the hotspot. The first client device 202 can use the received encrypted credentials to connect to the hotspot. The first client device 202 can decrypt the received encrypted credentials to verify the second client device 220 or hotspot provided by the second client device 220 is authorized, authenticated or otherwise valid.

At ACT 312, the first client device 202 can resume the virtual computing session in communication with the second client device 220. The first client device 202 can resume the virtual computing session provided by a server through network 236. The second client device 220 can facilitate providing aspects of the computing session via a second client application executing on the second client device.

Figure 4:
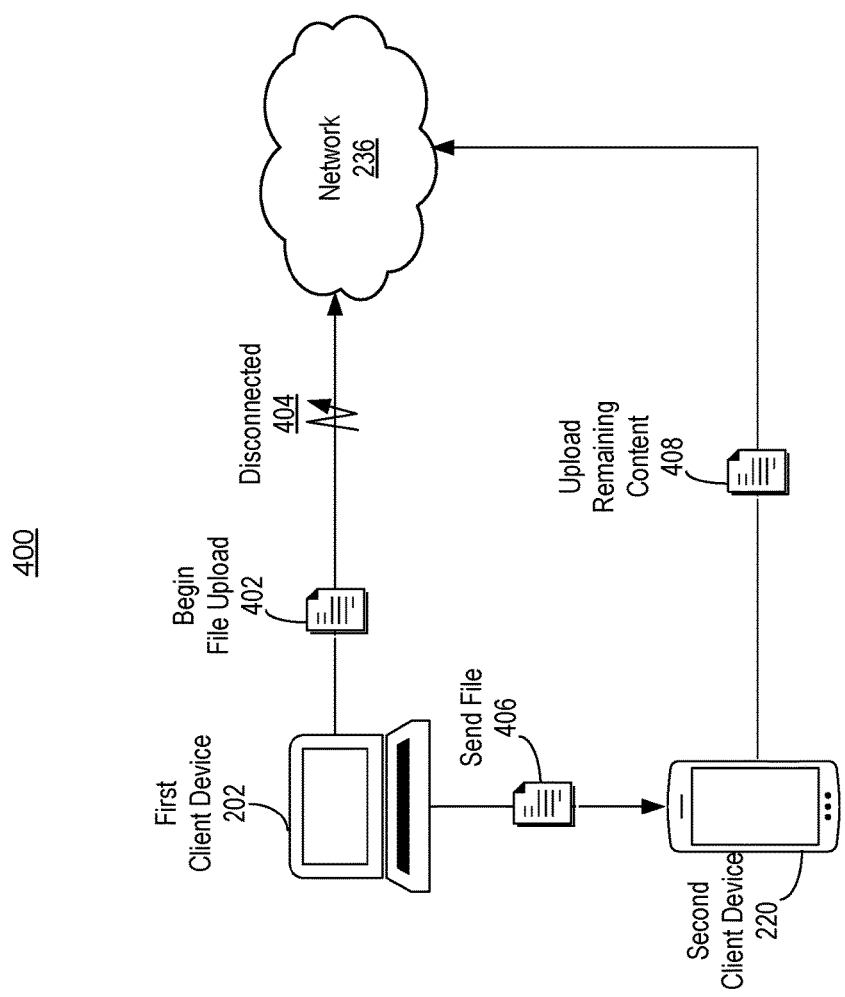
FIG. 4 depicts an example block diagram of an operation of a system to resume network access, in accordance with an implementation.

FIG. 4 depicts an example block diagram of an operation of a system to resume network access, in accordance with an implementation. The operation 400 can be performed by one or more system, component, module or functionality depicted in FIGS. 1A, 1B, and 2, including, for example, a first client device 202 and a second client device 220. In brief overview, at ACT 402, the first client device 202 can begin a file upload via network 236. At ACT 404, the first client device 202 can lose access to network 236. At ACT 406, the first client device 202 can send the file to the second client device 220. At ACT 408, the second client device 220 can upload the remaining contents of the file via network 236.

Still referring to FIG. 4, and in further detail, at ACT 402, the first client device 202 can begin a file upload via network 236. The first client device 202 can upload a file to a cloud storage server, file server, web server, or other recipient. The file can include any type of data file, such as a document, media content, application, computer program, executable file, configuration file, backup file, audio file, video file, video game, etc. The first client device 202 can begin the upload using a first client application. The first client device 202 can use any type of connection to access the network 236, including, for example, a WiFi connection to access the network 236. The type of network connection used by the first client device 202 to initially access network 236 can be referred to as primary communication channel 238.

At ACT 404, the first client device 202 can lose access to network 236. The first client device 202 can detect a disconnection from the network 236 using various techniques, including, for example, the first application determining that the upload percentage for the file upload initiated at ACT 402 is not increasing.

At ACT 406, the first client device 202 can send the file to the second client device 220. The first client device 202 can identify and select a second client device 220, connect to the second client device 222, and then send the file to the second client device 220. In some cases, the first client device 202 can request the second client device 220 to connect with the first client device 202 via a Bluetooth or WiFi connection. In some cases, the first client device 202 can request the second client device 220 to enable a hotspot function and connect to the second client device 220 via the hotspot. In some cases, the first client application executing on the first client device can communicate with a second client application executing on the second client device to send the file.

At ACT 408, the second client device 220 can upload the remaining contents of the file via network 236. The second client device 220 can use a different type of connection compared to the type of connection the first client device used to access network 236, such as a cellular data connection, to upload the file to the network 236. The second client device 220 can receive an indication of the amount remaining in the upload, and send the remaining amount to the server via network 236. The second client application 224 can manage the remainder of the upload. The second client application 224 can provide an indication of upload status to the first client application 206, such as indicating the percentage of the upload or that upload is complete.

In some cases, operation 400 can include one or more operations depicted in FIG. 3, including, for example, sending a request to enable hotspot, enabling a hotspot, and connecting to the hotspot.

Figure 5:
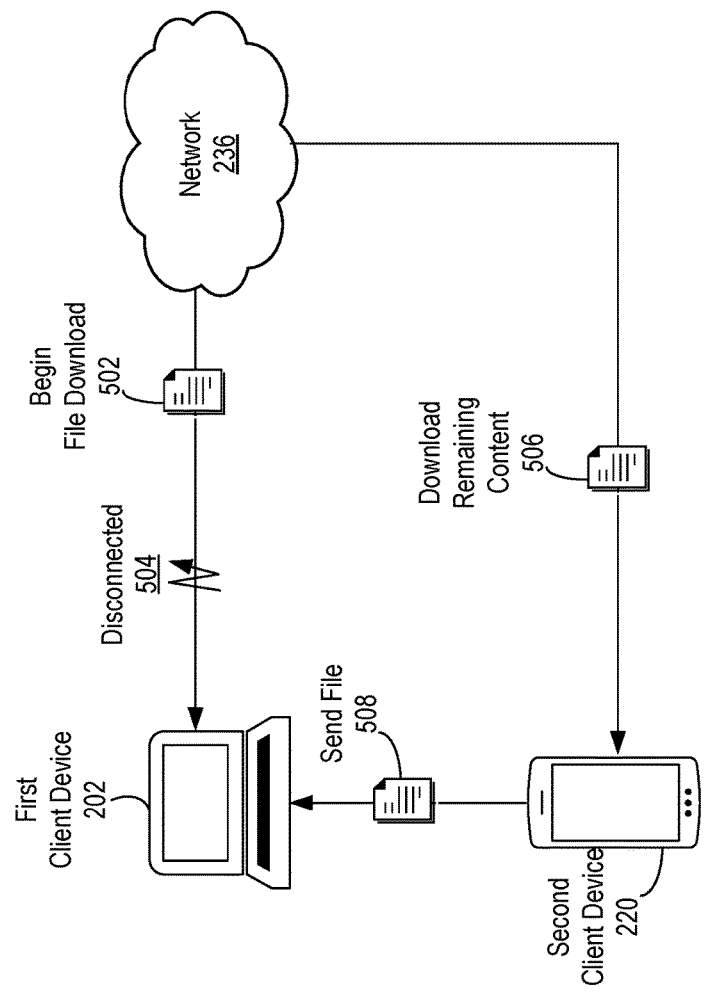
FIG. 5 depicts an example block diagram of an operation of a system to resume network access, in accordance with an implementation.

FIG. 5 depicts an example block diagram of an operation of a system to resume network access, in accordance with an implementation. The operation 500 can be performed by one or more system, component, module or functionality depicted in FIGS. 1A, 1B, and 2, including, for example, a first client device 202 and a second client device 220. In brief overview, at ACT 502, the first client device 202 can begin downloading a file. At ACT 504, the first client device 202 can lose access to network 236. At ACT 506, the second client device 220 can download the file to the second client device 220. At ACT 508, the second client device 220 can send the remaining contents of the file to the first client device 202.

Still referring to FIG. 5, and in further detail, the first client device 202 can begin downloading a file at ACT 502. The first client device 202 can execute a first client application to download the file. The file can include any type of data file and be downloaded from any source, such as a server, other client device, or cloud storage system, via a network 236. The first client device 202 can use any type of connection to access the network 236, including, for example, a WiFi connection to access the network 236. The type of network connection used by the first client device 202 to initially access network 236 can be referred to as primary communication channel 238.

At ACT 504, the first client device 202 can lose access to network 236. The first client device 202 can use any technique to detect disconnection to the network, including, for example, an indication that the download percentage is not increasing.

At ACT 506, the second client device 220 can download the file to the second client device 220. In some cases, the first client device 202 can send a request to the second client device 220 to resume the download via a second application 220 configured on the second client device. The second client device 220 can receive the information associated with the file download (e.g., source address of the file, filename, credentials, or state or status of download). The second client device 220 can resume the download the session from the source via network 236 via a different type of network connection, such as a cellular data connection. The network connection used by the second client device 220 can be referred to as secondary communication channel 240.

At ACT 508, the second client device 220 can send the remaining contents of the file to the first client device 202. The second client device 220 can send the remaining contents to the first application 206 of the first client device 202 via a secondary communication channel 240. The second client device 220 can use a Bluetooth or WiFi wireless communication to send the file to the first client device 202, and use a cellular network connection to receive the file from network 236. In some cases, the different communication channels can refer to different network service providers, network plans, network types, wireless access points, or communication routes.

In some cases, operation 500 can include one or more operations depicted in FIG. 3, including, for example, sending a request to enable hotspot, enabling a hotspot, and connecting to the hotspot.

Figure 6:
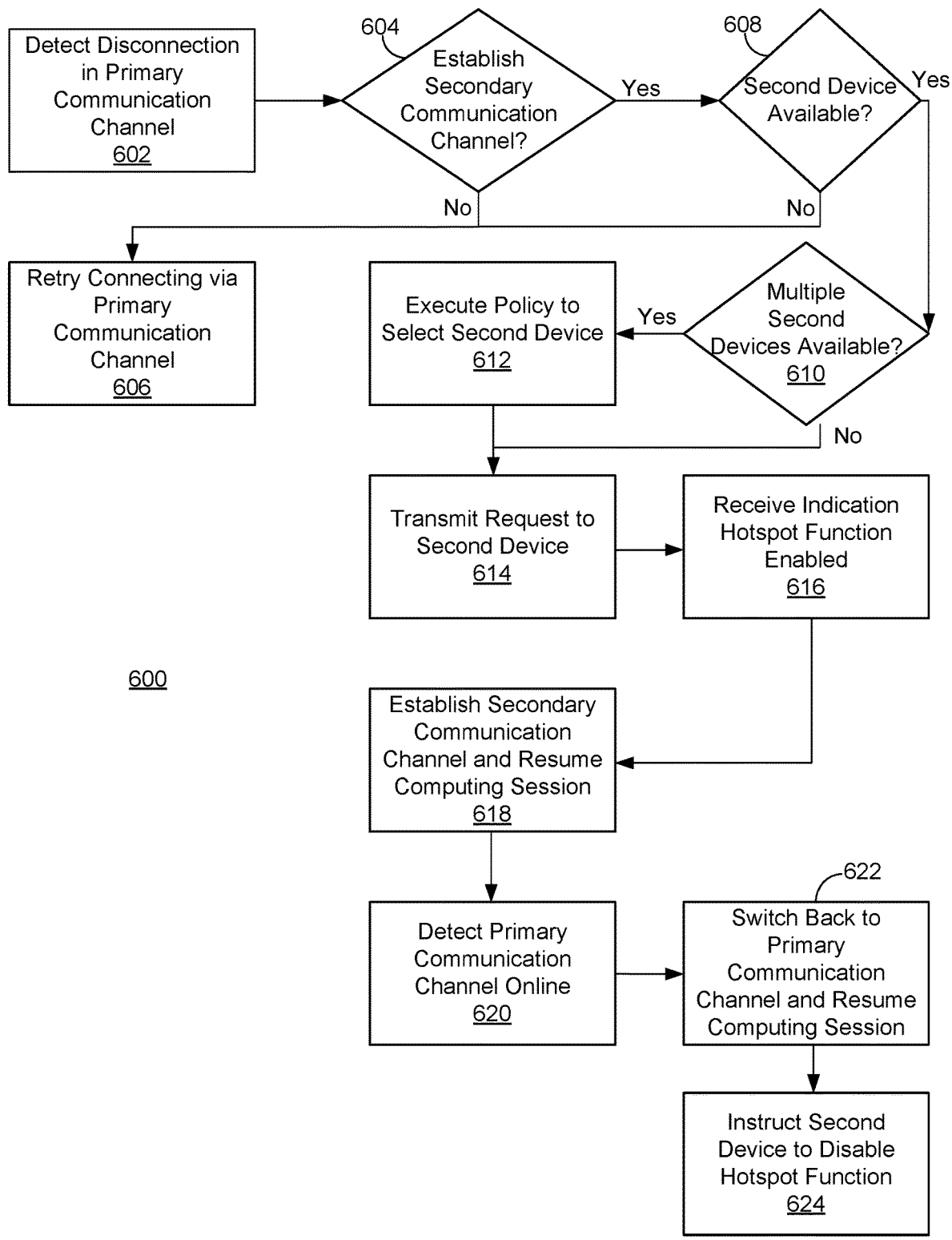
FIG. 6 depicts an example flow diagram of a method for resuming network access, in accordance with an implementation.

FIG. 6 depicts an example flow diagram of a method for resuming network access, in accordance with an implementation. The method 600 can be performed by one or more system, component, module or function depicted in FIG. 1A, 1B, or 2, including, for example, a first client device, first client application, second client device, or second client application. In brief overview, the first client application executed by the first client device can detect a disconnection in a primary communication channel at ACT 602. At decision block 604, the first client device can determine whether to establish a secondary communication channel. If, at decision block 604, the first client device determines not to establish a secondary communication channel, the first client device can proceed too ACT 606 and retry connecting via primary communication channel. If, however, at decision block 604 the first client device determines to establish a secondary communication channel, the first client device can proceed to decision block 608 to determine whether secondary devices are available. If there are no secondary devices available, the first client device can proceed to ACT 606 and retry connecting via the primary communication channel. If, however, at decision block 608 the first client device determines that secondary devices are available, the first client device can proceed to decision block 610 to determine whether there are more than one secondary devices available. If there is more than one secondary device available, then the first client device can proceed too ACT 612 to execute a prioritization policy to select a secondary device. The first client device can then transmit a request to the selected secondary device at ACT 614. If, however, at decision block 610 the first client device determines that there is only one secondary device available, the first client device can proceed directly to ACT 614 to transmit the request to the identified secondary device. At ACT 616, the first client device can receive an indication that a hotspot function on the second client device has been enabled. At ACT 618, the first client device can establish a communication channel and resume a computing session. At ACT 620, the first client device can detect that the primary communication is back online. At ACT 622, the first client device can switch the computing session back to the primary communication channel and resume the computing session. At ACT 624, the first client device can instruct the second client device to disable the hotspot function.

Still referring to FIG. 6, and in further detail, the first client application executed by the first client device can detect a disconnection in a primary communication channel at ACT 602. The first client device may have initiated a computing session via a network. The computing session can include a virtual desktop application, virtual computing session, file transfer, multimedia streaming, virtual meeting, video teleconference, voice-over-IP teleconference, or other type of computing session. The first client device can use various techniques to detect the network connection. For example, the first application can detect a pause or stop in data being received, or data being sent successfully via network. The first application can detect a network disconnect. The first client device can verify the network is disconnected by pinging one or more other servers or networked devices to see if a response is received.

At decision block 604, the first client device can determine whether to establish a secondary communication channel. The first client device can determine a type of computing session, and determine based on the type of computing session whether to establish a secondary communication channel in order to resume the computing session. The first client application can determine a current status of the computing session to determine whether to establish a secondary communication channel in order to resume the computing session. The status can refer to active, idle, or standby. For example, if the computing session is actively being used by a user of the first client device, then the first client application can determine to proceed with establishing a secondary communication channel to resume the computing session. However, if the first client application determines that the computing session is idle (e.g., the use has not provided any input via keyboard, mouse, touchscreen, or microphone for a certain duration of time, such as 5 minutes, 10 minutes, 15 minutes, 20 minutes or more), then the first client application can determine that it may be inefficient or a waste of computing resources, power, or network bandwidth to establish a secondary communication channel at this time because the user may not be actively using the computing session. Similarly, if the computing session was in a standby state, then the first client application can determine not to establish a secondary communication channel to resume the computing session.

In another example, the first client application can determine to establish the secondary communication channel based on the type of computing session or priority of the computing session. For example, if the type of computing session is an offline process, batch process, or offline file transfer, which can correspond to low priority processes that can be rescheduled to another time without having a negative impact on system performance or user experience, then the first client application can determine to reschedule the process or transfer to when the primary communication channel is back online. However, if the computing session is a high priority process such as an active virtual desktop application that is currently being used by the user, then the first client application can determine to seamlessly resume the computing session via the secondary communication channel.

If, at decision block 604, the first client device determines not to establish a secondary communication channel, the first client device can proceed too ACT 606 and retry connecting via primary communication channel. If, however, at decision block 604 the first client device determines to establish a secondary communication channel, the first client device can proceed to decision block 608 to determine whether secondary devices are available. The first client application can retrieve, from memory, a list of identifiers for second client devices and then poll, ping, broadcast, or otherwise query the second client devices using a wireless communication technique (e.g., Bluetooth, WiFi, near field communication, or radio frequency) to determine within any of the second client devices are within range of the first client device. The list of identifiers can correspond to second devices that have been previously paired, linked or bonded with the first client device, or otherwise configured to be paired with the first client device. Available second devices can refer to the second device being within a range or proximity of the first client device such that wireless communication can successfully occur between the first and second client devices. If there are no secondary devices available, the first client device can proceed to ACT 606 and retry connecting via the primary communication channel. If, however, at decision block 608 the first client device determines that secondary devices are available, the first client device can proceed to decision block 610 to determine whether there are more than one secondary devices available.

If there is only one secondary client device available (e.g., that responded to the ping, poll, or broadcast by the first client device), then the first client device can proceed to ACT 614. If there is more than one secondary device available, then the first client device can proceed too ACT 612 to execute a prioritization policy to select a secondary device. The prioritization policy can refer to a selection policy used to select highest ranking or highest priority second device to establish the secondary communication channel. The selection policy can take into account various characteristics, metrics, parameters or measurements associated with the first and second client devices, including, for example, wireless signal strength, network bandwidth, battery power, device type, version, other connections, or historical use. Using the selection policy, the first client application can select a second client device.

At ACT 614, the first client device can transmit a request to the selected secondary device to enable a hotspot connection. The request can include an instruction to enable the hotspot connection. The request can include credentials or other information to indicate that the first client application is authorized to request the second client device to enable a hotspot connection. The request can be transmitted using a wireless signal and protocol, such as Bluetooth.

At ACT 616, the first client device can receive an indication that a hotspot function on the second client device has been enabled. The first client device can further receive encrypted information such as credentials, SSID, or other information to allow the first client device to connect to the hotspot. The first client device can perform an authentication process prior to connecting to the hotspot based on the credentials.

At ACT 618, the first client device can establish a secondary communication channel and resume a computing session. The secondary communication channel can include a short-range interconnection via Bluetooth or WiFi between the first client device and the second client device, and a cellular network connection between the second client device and the network. The first client device can resume the computing session in communication with the second client device. For example, the second client device can receive an virtual desktop session file from a server via the cellular network connection and resume access the virtual desktop computing session. In another example, the second client device can resume a file transfer by receiving the file from the first client device and transmitting the file to the server via the network. Thus, the second client application can be configured with functionality that allows the first client application to resume a computing session.

At ACT 620, the first client device can detect that the primary communication is back online. The first client device can test whether the primary communication is online based on a time interval or responsive to a user request, a condition, or other trigger. For example, the first client application can check whether the primary communication channel is back online every 1 minute, 2 minutes, 5 minutes, 10 minutes or other time interval. The first client application can receive a request from a user to check if the primary communication channel is back online. The first client application can receive a request from the second client application to check if the primary communication channel is back online. For example, the second client application can determine that the remaining battery power on the second client device is low or below a threshold (e.g., less than 30% remaining power, 25%, 20%, 15%, 10%, 5% or less). Responsive to detecting a low battery power, the second client application can transmit a request to the first client application to switch back to a primary communication channel if available, or to switch to a different second client device with greater battery power if available (e.g., return to ACT 612 if multiple secondary client devices are available). In another example, the first client device can be triggered to check if the primary communication channel is back online or return to ACT 612 to select a different second device based on a wireless signal strength with the selected second client device falling below a threshold (e.g., the second client device is no longer proximate to the first client device). Thus, and in some cases, the first client device can return to ACT 612 to select a different secondary device, and switch the computing session to a different second device if the primary communication is not back online.

If the primary communication channel is back online, at ACT 622, the first client device can switch the computing session back to the primary communication channel and resume the computing session. The first client device can receive the configuration files for the computing session, or resume the remaining file transfers.

At ACT 624, the first client device can instruct the second client device to disable the hotspot function. The first client device, responsive to resuming the computing session via the primary communication channel coming back online, can instruct the second client application to terminate, disable, or end the hotspot function in order to conserve computing resources or power of the second client device. The second client application can check whether there are any other first client devices utilizing the hotspot function of the second client device to access the network. If not other client devices are connected to the second client device to access the network, then the second client application can proceed to disable the hotspot function.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It will be further understood that various changes in the details, materials, and arrangements of the parts that have been described and illustrated herein may be made by those skilled in the art without departing from the scope of the following claims.

We claim:

1. A method of resuming virtual computing sessions, comprising:
   detecting, by a first virtual delivery agent executed by a first client device to provide a virtual computing session on the first client device, a disconnection via a primary communication channel from a server hosting the virtual computing session;
   identifying, by the first virtual delivery agent responsive to detecting the disconnection, a second client device paired with the first client device;
   transmitting, by the first virtual delivery agent to a second virtual delivery agent executed by the second client device, a request to enable a hotspot function of the second client device;

receiving, by the first virtual delivery agent responsive to the request, an indication that the hotspot function of the second client device is enabled; and providing, by the first virtual delivery agent responsive to the indication that the hotspot function of the second client device is enabled, a file for the virtual computing session and an instruction to the second virtual delivery agent to resume, using the file, access to the virtual computing session hosted by the server via a secondary communication channel through the hotspot function of the second client device.

2. The method of claim 1, comprising:
pairing the first client device with the second client device via a short-range wireless interconnection.

3. The method of claim 1, comprising:
retrieving, from memory of the first client device, a plurality of identifiers for a plurality of second client devices previously paired with the first client device;
determining, by the first virtual delivery agent, a wireless signal strength between the first client device and each of the plurality of second client devices; and
selecting, by the first virtual delivery agent, the second client device based on a comparison of the wireless signal strength between the first client device and each of the plurality of second client devices.

4. The method of claim 1, wherein the second client device comprises a cellular radio system and the first client device lacks a cellular radio system, comprising:
establishing, by the first virtual delivery agent, the secondary communication channel to the server hosting the virtual computing session via the hotspot function formed from a short-range wireless interconnection between the first client device and the second client device, and a cellular wireless connection between the second client device and the server.

5. The method of claim 1, comprising:
detecting, by the first virtual delivery agent subsequent to the disconnection, a resumption of access to the server hosting the virtual computing session via the primary communication channel; and
transmitting, by the first virtual delivery agent responsive to detecting the access to the server via the primary communication channel, an indication to the second client device to disable the hotspot function and terminate the secondary communication channel to the server.

6. The method of claim 1, comprising:
receiving, by the first virtual delivery agent responsive to the request to enable the hotspot function, a network identifier and authentication credentials from the second virtual delivery agent; and
using, by the first virtual delivery agent, the network identifier and the authentication credentials to establish the secondary communication channel to the server via the second client device.

7. The method of claim 1, comprising:
initiating, by the first virtual delivery agent, a file transfer via the primary communication channel;
detecting, by the first virtual delivery agent subsequent to initiation of the file transfer and prior to completion of the file transfer, the disconnection from the server via the primary communication channel; and
resuming, by the first virtual delivery agent in communication with the second virtual delivery agent, the file transfer via the secondary communication channel to the server via a short-range wireless interconnection between the first client device and the second client device, and a cellular wireless connection between the second client device and the server.

8. The method of claim 1, comprising:
switching, by the first virtual delivery agent, from a first application configured for the primary communication channel to a second application configured for communication with the second virtual delivery agent responsive to establishing the secondary communication channel.

9. The method of claim 1, comprising:
providing, by the first virtual delivery agent via the primary communication channel, a virtual desktop session hosted by the server;
detecting, by the first virtual delivery agent subsequent to provision of the virtual desktop session via the primary communication channel, the disconnection from the server via the primary communication channel;
providing, by the first virtual delivery agent to the second virtual delivery agent responsive to establishing the secondary communication channel, an indication to relaunch the virtual desktop session; and
relaunching, by the first virtual delivery agent through the secondary communication channel to the server via a short-range wireless interconnection between the first client device and the second client device, the virtual desktop session responsive to the second virtual delivery agent receiving, from the server, a configuration file for the virtual desktop session.

10. The method of claim 1, wherein the first client device comprises a laptop computing device, and the second client device comprises a mobile phone.

11. A system to resume network access, comprising:
a first client device having one or more processors that execute a first virtual delivery agent configured to:
provide, via a primary communication channel with a server, a virtual computing session hosted by the server;
detect a disconnection from the server via the primary communication channel;
identify, responsive to detection of the disconnection, a second client device paired with the first client device;
transmit, to a second virtual delivery agent executed by the second client device, a request to enable a hotspot function of the second client device;
receive, responsive to the request, an indication that the hotspot function of the second client device is enabled; and
provide, responsive to the indication that the hotspot function of the second client device is enabled, a file for the virtual computing session and an instruction to the second virtual delivery agent to resume, using the file, access to the virtual computing session hosted by the server via a secondary communication channel through the hotspot function of the second client device.

12. The system of claim 11, wherein the first virtual delivery agent is further configured to:
pair the first client device with the second client device via a short-range wireless interconnection.

13. The system of claim 11, wherein the first virtual delivery agent is further configured to:
retrieve, from memory of the first client device, a plurality of identifiers for a plurality of second client devices previously paired with the first client device;
determine a wireless signal strength between the first client device and each of the plurality of second client devices; and select the second client device based on a comparison of the wireless signal strength between the first client device and each of the plurality of second client devices.

14. The system of claim 11, wherein the second client device comprises a cellular radio system, the first client device lacks a cellular radio system, and the first virtual delivery agent is further configured to:
establish the secondary communication channel to the server hosting the virtual computing session via the hotspot function formed from a short-range wireless interconnection between the first client device and the second client device, and a cellular wireless connection between the second client device and the server.

15. The system of claim 11, wherein the first virtual delivery agent is further configured to:
detect, subsequent to the disconnection, a resumption of access to the server hosting the virtual computing session via the primary communication channel; and
transmit, responsive to detecting the access to the network via the primary communication channel, an indication to the second client device to disable the hotspot function and terminate the secondary communication channel to the server.

16. The system of claim 11, wherein the first virtual delivery agent is further configured to:
receive, responsive to the request to enable the hotspot function, a network identifier and authentication credentials from the second virtual delivery agent; and
use the network identifier and the authentication credentials to establish the secondary communication channel to the server via the second client device.

17. The system of claim 11, wherein the first virtual delivery agent is further configured to:
initiate a file transfer via the primary communication channel;
detect, subsequent to initiation of the file transfer and prior to completion of the file transfer, the disconnection from the server via the primary communication channel; and
communicate with the second virtual delivery agent to resume the file transfer via the secondary communication channel to the server via a short-range wireless interconnection between the first client device and the second client device, and a cellular wireless connection between the second client device and the server.

18. The system of claim 11, wherein the first virtual delivery agent is further configured to:
provide, via the primary communication channel, a virtual desktop session hosted by the server;
detect, subsequent to provision of the virtual desktop session via the primary communication channel, the disconnection from the server via the primary communication channel;
provide, to the second virtual delivery agent responsive to establishing the secondary communication channel, an indication to relaunch the virtual desktop session; and
relaunch, through the secondary communication channel to the server via a short-range wireless interconnection between the first client device and the second client device, the virtual desktop session responsive to the second virtual delivery agent receiving, from the server, a configuration file for the virtual desktop session.

19. A non-transitory computer readable medium storing program instructions for causing one or more processors to:
execute a first virtual delivery agent on a first client device;
provide, by the first virtual delivery agent via a primary communication channel with a server, a virtual computing session hosted by the server;
detect, by the first virtual delivery agent, a disconnection from the server via the primary communication channel;
identify, by the first virtual delivery agent, responsive to detection of the disconnection, a second client device paired with the first client device;
transmit, by the first virtual delivery agent to a second virtual delivery agent executed by the first client device, a request to enable a hotspot function of the second client device;
receive, by the first virtual delivery agent responsive to the request, an indication that the hotspot function of the second client device is enabled; and
providing, by the first virtual delivery agent responsive to the indication that the hotspot function of the second client device is enabled, a file for the virtual computing session and an instruction to the second virtual delivery agent to resume, using the file, access to the virtual computing session hosted by the server via a secondary communication channel through the hotspot function of the second client device.

20. The non-transitory computer readable medium of claim 19, wherein the program instructions further cause the one or more processors to:
retrieve, from memory of the first client device, a plurality of identifiers for a plurality of secondary client devices previously paired with the first client device;
determine a wireless signal strength between the first client device and each of the plurality of secondary client devices; and
select the second client device based on a comparison of the wireless signal strength between the first client device and each of the plurality of secondary client devices.

* * * * *